US012591421B2

(12) United States Patent
Vasiltschenko et al.

(10) Patent No.: US 12,591,421 B2
(45) Date of Patent: Mar. 31, 2026

(54) SYSTEMS AND METHODS FOR ENABLING SOFTWARE CODE FOR DIFFERENT LANGUAGES

(71) Applicant: SAP SE, Walldorf (DE)

(72) Inventors: Michail Vasiltschenko, Schriesheim (DE); Thomas Wienold, Offenbach (DE); Christian Lieske, Malsch (DE); Maite Friedrich Dupont, Porto Alegre (BR)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 18/530,055

(22) Filed: Dec. 5, 2023

(65) Prior Publication Data

US 2025/0181336 A1 Jun. 5, 2025

(51) Int. Cl.

| | |
|---|---|
| ***G06F 9/44*** | (2018.01) |
| ***G06F 8/51*** | (2018.01) |
| ***G06F 11/3604*** | (2025.01) |
| ***G06F 40/279*** | (2020.01) |

(52) U.S. Cl.

CPC ............ *G06F 8/51* (2013.01); *G06F 11/3604* (2013.01); *G06F 40/279* (2020.01)

(58) Field of Classification Search

CPC ....... G06F 8/51; G06F 40/279; G06F 11/3604

See application file for complete search history.

(56) References Cited

U.S. PATENT DOCUMENTS

| | | | | |
|---|---|---|---|---|
| 10,635,566 | B1 * | 4/2020 | Talluri | G06F 8/433 |
| 11,693,637 | B1 * | 7/2023 | Singh | G06F 8/436<br>717/139 |
| 2019/0379770 | A1 * | 12/2019 | Thantry | G06F 16/903 |
| 2022/0207246 | A1 * | 6/2022 | Ha | G06F 40/279 |
| 2024/0211224 | A1 * | 6/2024 | Clement | G06F 8/41 |
| 2025/0173525 | A1 * | 5/2025 | Verma | G06F 40/56 |

* cited by examiner

*Primary Examiner* — Qamrun Nahar

(74) *Attorney, Agent, or Firm* — Fountainhead Law Group, PC

(57) ABSTRACT

Embodiments of the present disclosure include techniques for enabling software code for different languages. In one embodiment, a user creates a prompt. The prompt may be to generate new code or modify existing code. The prompt may be automatically modified to include one or more instructions to extract code elements from source code and the code elements may be translated. In some embodiments, translation services are incorporated into and IDE or build environment as a plugin.

17 Claims, 4 Drawing Sheets

500

Server(s) 533

Server 532

Server(s) 531

530

Internet

Server 534

Network 520

Network Interface 504

505

Storage Device 503

Memory 502

Processor(s) 501

Display 512

Input Device 511

510

SYSTEMS AND METHODS FOR ENABLING SOFTWARE CODE FOR DIFFERENT LANGUAGES

BACKGROUND

The present disclosure relates generally to computer systems, and in particular, to systems and method for enabling software code to support different languages.

Software applications comprise executable code written by software developers. Typically, the developers write the texts that are displayed by their code in a language that is either native to the developer or the language of the target market for the software application. Accordingly, much of these texts may be written in one language that may not be suitable for deployment globally. Developing code for worldwide use can be time consuming and expensive.

The present disclosure addresses these and other challenges and is directed to techniques for generating software code in different languages.

DETAILED DESCRIPTION

Figure 1:
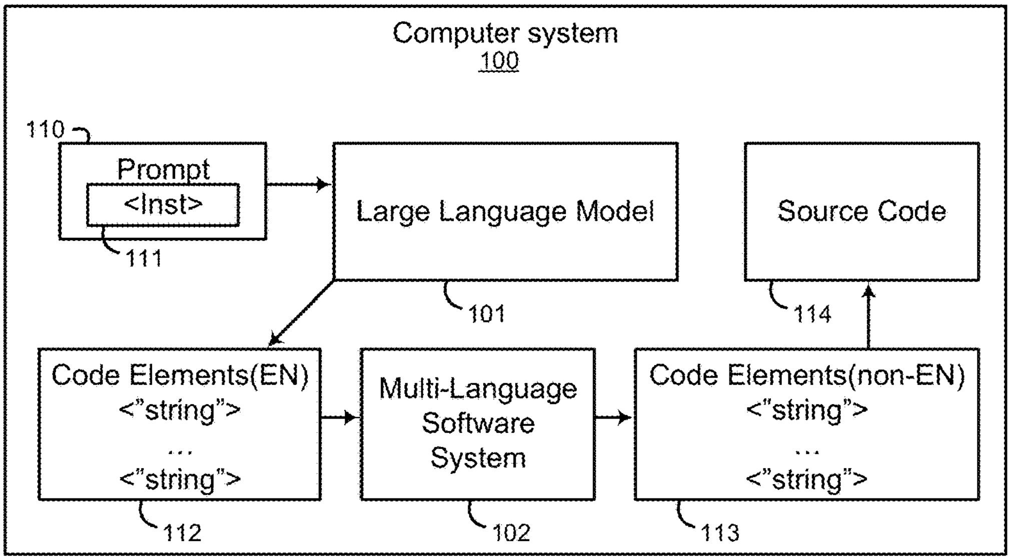
FIG. 1 illustrates a computer system for generating software code in different languages according to an embodiment.

Described herein are techniques for enabling software code for different languages. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include techniques for using generative artificial intelligence (AI) (e.g., large language models) to generate prompts that instruct the AI models in a way that ensures their code output is translatable. Embodiments may be used in the form of prompt embedding, adding prompt parts to a pre-existing prompt created by a software developer, in order to ensure new AI generated code is translatable, or it can also be used standalone to process existing code in order to make it translatable, for example. In some embodiments, the present disclosure includes a software system or methods that may be used as a plugin that can be installed on a development tool or in a build infrastructure. A development tool refers to a tool used to create software, known as IDE (Integrated Development Environment). Through this plugin, the user can make all necessary configurations regarding how the plugin should behave and respond. A build infrastructure is a set of tools working together to bring source code to a deliverable state. Usually this includes at least a source code management software system (like Git or SVN) and a processing tool commonly called 'pipeline', for example.

In some embodiments, the present disclosure includes software services (tools or components) to optimize the software end-to-end development process related to language expertise, which will help developers and development teams to design solutions for use in different languages. For example, a large language model (LLM) may be trained on top of existing generative AI solutions focused on translatability and code adaptations. In some embodiments, the system includes a training layer focused on identifying and refactoring code for translatability. In some embodiments, the system is configured to detect language translation problems when receiving or generating a generative LLM prompt to generate source code. For example, a generative AI may receive requests to store UI text strings in the code in properties files or an ABAP backend in order to ensure the translatability. Further, the system may include connections to additional sources like a "Source Quality" system, which performs quality checks for English source language texts (e.g., as part of continuous software build process), a machine translation software system, and different LLMs to verify the quality of generated UIs texts, translate them, and check the quality of the resulting translation. For example, the system may verify inputs and/or outputs of an LLM using source quality API (for input) or machine translation API (for output) to ensure consistent terminology usage. In some embodiments, a generative LLM may learn iteratively with feedback from developers, for example. Accordingly, project configurations related to translatability may be shared across developers and teams to improve translatability of software products, for example. As mentioned above, in some embodiments, the present disclosure may include a plugin for software development tools which offers a large scale of services related to language expertise. From warnings to the developer when hardcoded texts are detected ("Did you think about other countries/languages?") to automatically embedded prompt engineering in order to ensure that the AI-generated code is translatable.

FIG. 1 illustrates a computer system for generating software code in different languages according to an embodiment. Computer system 100 includes a large language model (LLM) 101 and multi-language software system 102. LLM 101 may be a generative LLM, for example, such as ChatGPT from OpenAI or similar system. An LLM is a type of artificial intelligence (AI) algorithm that uses deep learning techniques and massively large data sets to generate new content. The term generative AI (or generative LLM) also is closely connected with LLMs, which are, in fact, a type of generative AI that has been specifically architected to help generate text-based content. LLMs are artificial neural networks (mainly transformers) and are typically trained using self-supervised learning and semi-supervised learning. Multi-language software system 102 may be a language translation system (aka, machine translation, MT), which translates input text from one language to another language, such as a language spoken by people, for example.

In some embodiments, system 100 may generate code in a plurality of languages. A prompt 110 may specify source code. Prompt 110 includes an instruction 111 to extract translatable code elements from the source code. In some embodiments, prompt 110 is generated by a user. In other embodiments, a user enters a first prompt to generate source code and the prompt from the user is automatically modified to include the instruction to extract translatable code elements from the source code. In some embodiments, prompt 110 comprises an instruction to generate source code. In other embodiments, prompt 110 comprises source code to be processed by the LLM to extract code elements to be translated as described herein. In some embodiments, the prompt specifies a parts of the source code that includes text values to be extracted. Additionally, instruction 111 may specify a file 112 to store extracted code elements.

Prompt 110 may be entered into LLM 101. LLM 101 may process source code and extract code elements from the source code. As indicated above, in some embodiments LLM 110 may produce code elements from existing source code. In other embodiments, LLM 110 may generate source code and produce code elements to be translated. Code elements are stored in a code elements file 112. In various embodiments, code elements comprise hard coded text strings (e.g., "sting") output to a user (e.g., as messages in a UI) in the source code. Such code elements may be part of a print, standard I/O, display, message, or similar code construct comprising a string of characters printed to an output device, for example.

In this embodiment, the code elements received from the large language model are sent to multi-language software system 102. Multi-language software system 102 receives the code elements in a first language and converts the code elements into a second plurality of code elements in a different language. In some embodiments, the second plurality of code elements comprise the hard coded text strings translated into a different language. The second plurality of code elements may be stored in an output code elements file 113, for example. Additionally, the system may replace the plurality of code elements in the source code with the second plurality of code elements in the different language to produce source code 114. In some embodiments, LLM 101 is trained to identify first hard coded text strings and replace the first hard coded text strings with links to one or more external files 113 comprising the second hard coded text strings in a different language. Accordingly, output text strings in one language in initial source code may be replaced with links to output text strings in a file so that the language of the output text strings may be changed by changing an associated language text file rather than the source code.

Figure 2:
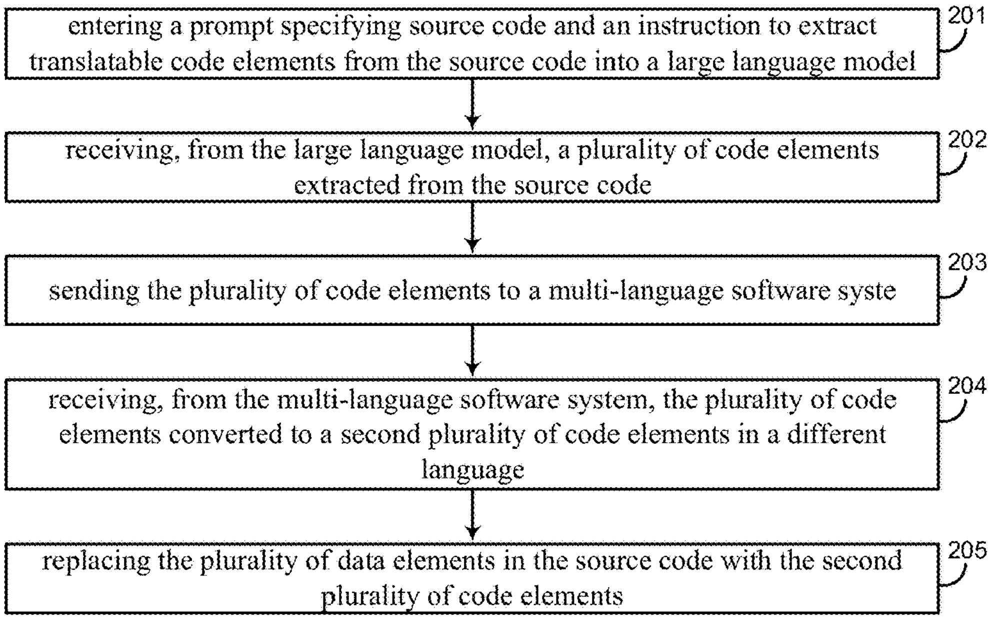
FIG. 2 illustrates a method of generating software code in different languages according to an embodiment.

FIG. 2 illustrates a method of generating software code in different languages according to an embodiment. At 201, a prompt specifying source code and an instruction to extract translatable code elements from the source code is entered into a large language model. At 202, a plurality of code elements extracted from the source code are received from the large language model. At 203, the plurality of code elements are sent to a multi-language software system (such as a language translator). At 204, the plurality of code elements are received from the multi-language software system converted to a second plurality of code elements in a different language. At 205, the plurality of code elements in the source code are replaced with the second plurality of code elements (e.g., directly or using a link to an external file as described above). In various embodiments, steps 201-205 (e.g., entering, receiving the plurality of code elements, sending, receiving the second plurality of code elements, and replacement steps) are incorporated into an integrated development environment as a translation plug-in. In other embodiments, steps 201-205 are incorporated into a build environment as a translation plug-in. In some embodiments, a user may review the second plurality of code elements from the language translator and enter the second plurality of code elements into a language verification software system (e.g., a domain specific or company electronic glossary or dictionary) to verify the second plurality of code elements.

In various embodiment, the present disclosure may include techniques for translating software code into different languages. In some embodiments, generative AI may be used to generate code (e.g., boilerplate code, which does not include business rules or is complex in nature but requires time and effort to be created). Embodiments may use such an approach to generating new code for new applications that are translatable and translated as generated, transform current applications into a new coding/technology stack, provide customers with the possibility to modify default usage scenarios in an easy and quick way, and/or make non-translatable existing applications translatable by running them through LLMs and other foundation models. For example, many software applications are built with the "English (EN) First" approach. Embodiments of the present disclosure may use language software systems to provide code for non-EN speaking countries from the beginning. Accordingly, the present disclosure includes tools to optimize the essential parts of the end-to-end development process related to language expertise which may help developers and development teams to design solutions which can be used in different languages. For example, as mentioned above, embodiments may support "Translation aware" prompt engineering (e.g., ensuring the translatability) at the UX design and then development stage (e.g., clear requests to have the UI texts and the messages stored in properties files or an ABAP backend in order to ensure the translatability), connection to additional sources like SAP® Source Quality Control (SQC), machine translation (MT) and different LLMs to verify the quality of generated UIs texts, translate and check the quality of the resulting translation (e.g., using an SQC API (for input) or MT API (output) and verify the input/output for example for consistent terminology usage), enable an obligatory human-review step by native speakers with In-Context Editing and saving the changes in a way that permits learning from them (e.g., using a cloud translator for checking UIs and providing missing translations based on translation memories and MT), and/or adaptions (or enhancements/customization) of the UI texts on the customer side (e.g., providing points 1-3 to customers as a commercial offering), for example. Accordingly, embodiments of the present disclosure include, for example, an IDE Plugin which offers a full scale of services from warnings ("Did you think about other countries/languages?") to automatically embedded prompt engineering in order to ensure that AI-generated code is translatable. The plugin can provide an underlying connection to one or more language repositories and MT software systems, among other language services.

Figure 3:
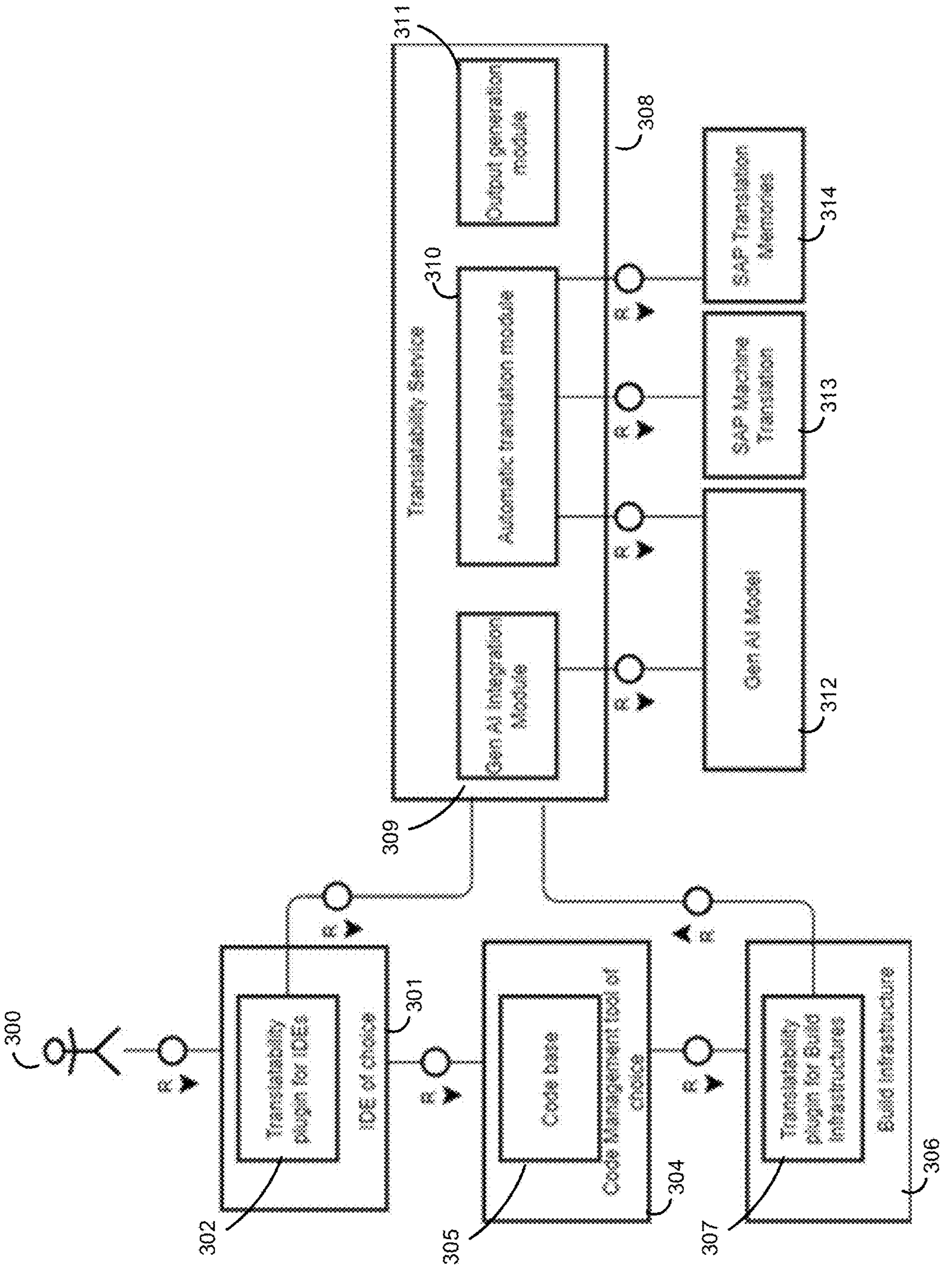
FIG. 3 illustrates an example architecture for generating software code in different languages according to an embodiment.

FIG. 3 illustrates an example software architecture for generating software code in different languages according to an embodiment. In this example, a user 300 may invoke an IDE 301 to create source code. IDE 301 may include translatability plugin 302, for example, which links to a translatability service 308. IDE 301 may be coupled to a code management tool 304 (e.g. Github), which may include a code base 305. In some embodiments, code management tool 304 may be coupled to a build infrastructure system 306 comprising a translatability plugin 307 linked to translatability service 308. In various embodiments, automatic translation features may not be visible to the user 300. Translatability service 308 is a set of features hosted in a server that are invoked upon the activation of the plugin and is responsible for actually doing the work requested. Translatability service 308 comprises a generative AI integration module 309 (i.e, a generative LLM), an automatic translation module 310, and an output generation module 311. Generative AI integration module 309 is coupled to a generative AI model 312, such as ChatGPT. Automatic translation module 310 is coupled to generative AI model 312, a machine translation module 313, and a translation memories module 314. Translation Memories Module 314 provides human-reviewed translation alternatives to the outputs generated by the SAP Machine Translation 313. Translatability service 308 is responsible for generating prompts for generative AI models based on the developer's request and configurations, as well as mediating the communication between different internal modules 309-311. For instance, translatability service 308 may receive results from the AI model 312 and send it to automatic translation module 310, which integrates with existing services like machine translation system 313 and translation memories system 314. Output generation module 311 may parse AI model results into the format specified by the developer, for example. The settings of a developer (e.g., in translatability plugin configuration settings) can be re-used by other developers, for example. The human corrections can be re-used for the training of the GenAI instance or for the adapting the configuration of the translatability plugin.

Figure 4:
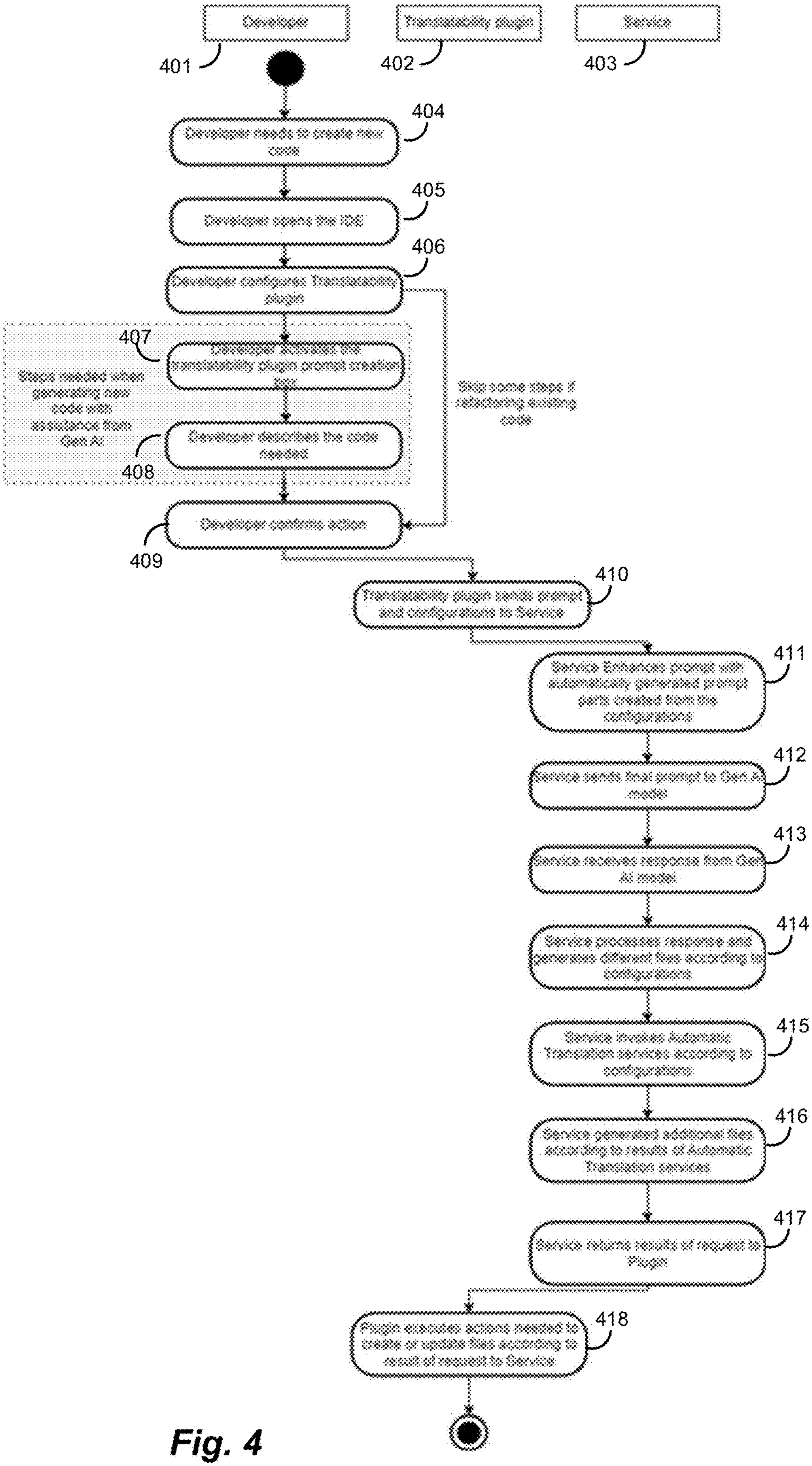
FIG. 4 illustrates an example algorithm for generating software code in different languages according to an embodiment.

FIG. 4 illustrates an example algorithm for generating software code in different languages according to an embodiment. The following algorithm illustrates the actions performed by a developer 401, the translatability plugin 402 (aka, module 302 or 307 in FIG. 3), and the translatability service 403 (aka, module 308 in FIG. 3). At 404, a developer may need to create new code. At 405, the developer opens the IDE. At 406, the developer configures the translatability plugin. Configurations can include for example what is the programming language used in the code, if the display texts should be translated, into which languages they should be translated, which Translation memories should be used, where should the output be stored etc. At 407, the developer activates a translatability plugin prompt creation tool. At 408, the developer descripts the code to be generated. Steps 407-408 may be used to generate new code by the AI, but may be skipped if the system is refactoring existing code. At 409, the developer confirms the actions and settings. At 410, the translatability plugin 402 sends the prompt and configurations to the translatability service 403. At 411, translatability service 403 modifies the prompt by automatically generating new prompt components created from the configuration settings. For instance, if the programming language used by the developer is Java, the translatability service 403 may add prompt parts asking for a Java Code. At 412, service 403 sends a final prompt to the generative AI model. At 413, service 403 receives a response from the generative AI model. At 414, service 403 processes the response and generates different files according to the configurations. For instance, the textual output of the LLM is temporarily stored as a file in memory while the rest of the process happens. At 415, service 403 invokes automatic translation service 313 of FIG. 4 according to the configurations. If translations are requested via configuration, automatic translation is invoked from Machine Translation and Translation Memories. At 414, service 403 generates additional files according to the results of automatic translation. For instance, if automatic translations are requested, one file per language may be created with corresponding translations and according to the configured naming convention. At 417, service 403 returns results to plugin 402. At 418, the plugin executes actions needed to create or update files according to the results of service 403. For instance files are stored in the folder indicated by the developer at the time that configurations are done. Files may include code only files and also translatable files.

Examples

In a first example scenario, a developer is requesting the plugin to generate new code. The developer creates the following prompt:

"Please create a simple Sales Order Fiori app containing material number, name of article, price and the amount."

The plugin calls the underlying generative AI model with this prompt as requested by the developer, but this prompt would render a code that contains hard coded strings and is therefore not translatable. Therefore, the present improved plugin can use a 'prompt embedding' technique to enhance the developer's prompt in order to ensure the resulting code is translatable. Gen AI integration model in FIG. 3 may generate the following prompt:

"The UI text strings should be in properties file."

If the developer would so choose, they could also instruct the plugin via settings that there is need to provide automatic translation for the generated texts. In this case, the plugin can also modify the prompt to ask the Gen AI model to provide translation files in specific languages as follows:

"A translation of the texts into German should be provided."

The resulting prompt may then be as follows:

"Please create a simple Sales Order Fiori app containing material number, name of article, price and the amount. The UI text strings should be in properties file. A translation of the texts into German should be provided."

As indicated above, the AI model/LLM may be trained to generate code for a particular application (e.g., Fiori). The LLM Output is as follows:

[OUTPUT] "Creating an SAP Fiori app involves several steps, including setting up the environment, creating the OData service, and implementing the UI5 frontend. It's a bit too detailed to fully cover in this response, but I can guide you on how to create a basic UI5 app with the given requirement.

[OUTPUT] Keep in mind that you need to have SAP Web IDE or SAP Business Application Studio to create the app, and also have the necessary permissions to deploy the app to your Fiori Launchpad.

[OUTPUT] Below is a simplified example of how the UI5 code could look like. This example creates a simple table with the given fields. The data would usually come from an OData service, but for simplicity, I'm using a JSON model.

[OUTPUT CODE]

```
    ```javascript
sap.ui.define([
    "sap/ui/core/mvc/Controller",
    "sap/ui/model/json/JSONModel"
```
```

-continued

[OUTPUT CODE]

```
], function (Controller, JSONModel) {
   "use strict";
   return Controller.extend("my.app.controller.Main", {
      onInit: function ( ) {
         var oData = {
         salesOrders: [
            { materialNumber: "001", nameOfArticle: "Article 1", price: 10, amount: 5 },
            { materialNumber: "002", nameOfArticle: "Article 2", price: 15, amount: 3 }
         ]
      };
      var oModel = new JSONModel(oData);
      this.get View( ).setModel(oModel);
   }
  });
});
```

```xml
<mvc: View xmlns:mvc="sap.ui.core.mvc" xmlns="sap.m"
controllerName="my.app.controller.Main">
  <Table items="{/salesOrders}">
    <columns>
      <Column>
        <Text text="{i18n>materialNumber}" /> -- i18n>"text" is link to external text
      </Column>
      <Column>
        <Text text="{i18n>nameOfArticle}" />
      </Column>
      <Column>
        <Text text="{i18n>price}" />
      </Column>
      <Column>
        <Text text="{i18n>amount}" />
      </Column>
    </columns>
    <items>
      <ColumnListItem>
        <cells>
          <Text text=" { materialNumber}" />
          <Text text=" { nameOfArticle}" />
          <Text text="{price}" />
          <Text text="{ amount } " />
        </cells>
      </ColumnListItem>
    </items>
  </Table>
</mvc:View>
```

For the translations, you would have a 'i18n.properties' file for English:

```
materialNumber=Material Number
nameOfArticle=Name of Article
price=Price
amount=Amount
```
Additionally, there is a `i18n.de.properties` file for German:
```
materialNumber=Materialnummer
nameOfArticle=Artikelname
price=Preis
amount=Menge
```

As yet another example, a developer may request the plugin to refactor existing code to make it translatable. This may be the case with legacy code or human generated code where language features are not taken into account from the beginning of development.

In this case, the developer may not need to provide a prompt. Rather, code translatability is generated by the plugin based on configurations done by the developer such as programming language of the source code, target format of the internationalized files, location of these files, languages into which extracted texts should be translated etc.

When the developer sends the command to refactor, the plugin will send the code along with an automatically generated prompt. If the desired format is a properties files, for instance, the generated prompt may be as follows:

[NEW PROMPT] Please extract the translation relevant texts from the code below into a properties file that can be used in translation. Replace the texts by their corresponding keys in the code and return the whole code. Give me just the result, not the steps or explanations.

If translations were requested, this request can also be embedded to the default prompt as follows:

[NEW PROMPT SEGMENT] Generate the corresponding translation files for the properties file into German.

An example of the pre-existing input source code is as follows:

```
<mvc: View controllerName="my.namespace.controller.SalesOrder"
xmlns:mvc="sap.ui.core.mvc" xmlns="sap.m">
```

-continued

```
  <Page title="Sales Order">
    <content>
      <Label text="Material Number"/>
      <Input id="materialNumber"/>
      <Label text="Name of Article"/>
      <Input id="articleName"/>
      <Label text="Price"/>
      <Input id="price"/>
      <Label text="Amount"/>
      <Input id="amount"/>
      <Button text="Submit" press="onSubmit"/>
    </content>
  </Page>
</mvc: View>
```
```

An example of the LLM output code is as follows:

```
```
<mvc: View controllerName="my.namespace.controller. SalesOrder"
xmlns:mvc="sap.ui.core.mvc" xmlns="sap.m">
  <Page title="{i18n>SalesOrder}">
    <content>
      <Label text="{i18n>MaterialNumber}"/>
      <Input id="materialNumber"/>
      <Label text="{i18n>NameOfArticle}"/>
      <Input id="articleName"/>
      <Label text="{i18n>Price}"/>
      <Input id="price"/>
      <Label text="{i18n>Amount}"/>
      <Input id="amount"/>
      <Button text="{i18n>Submit}" press="onSubmit"/>
    </content>
  </Page>
</mvc: View>
```
```

An example of the LLM output properties file is as follows:

```
```
SalesOrder=Sales Order
MaterialNumber=Material Number
NameOfArticle=Name of Article
Price=Price
Amount=Amount
Submit=Submit
```
```

Figure 5:
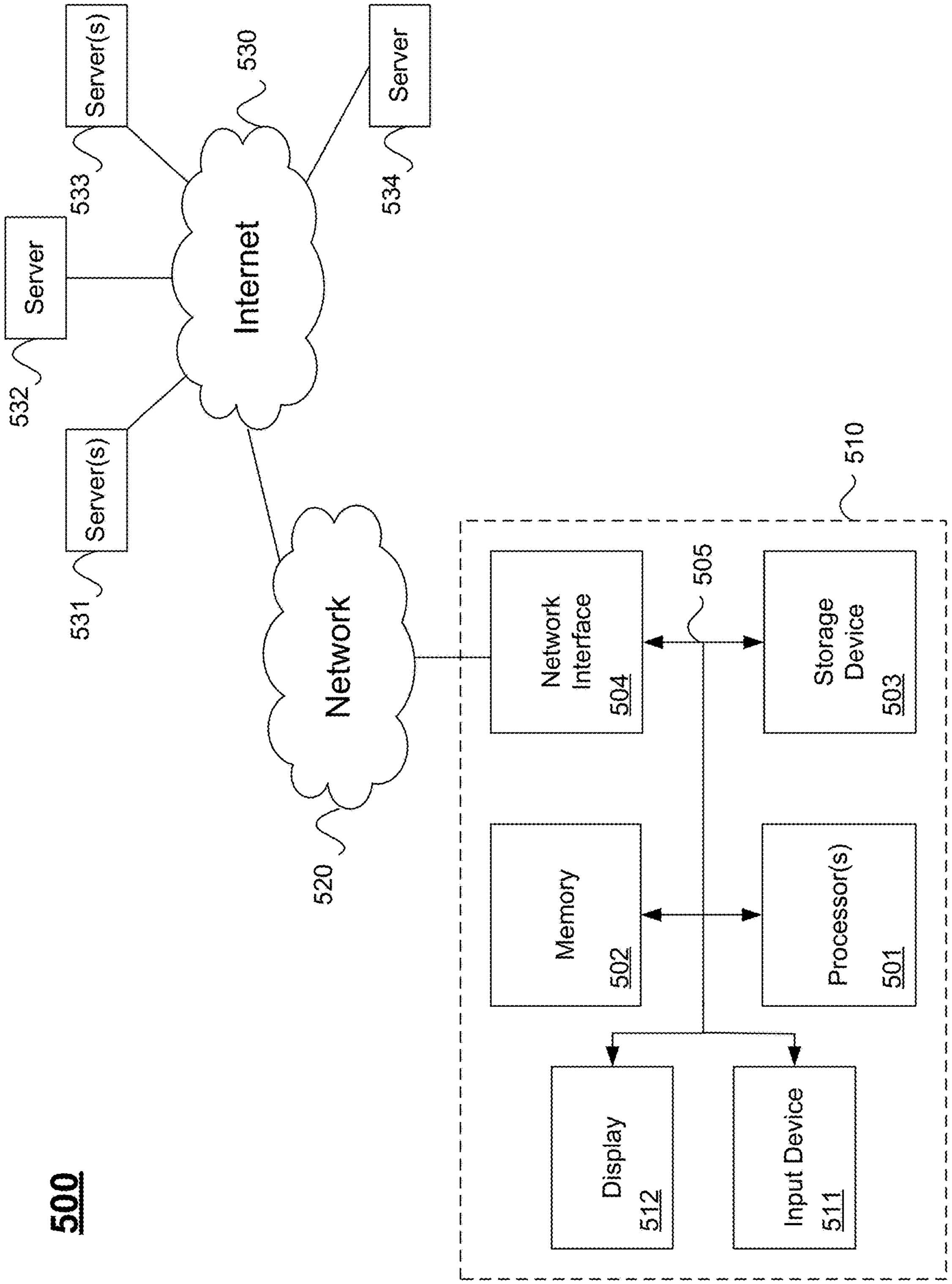
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of generating code in a plurality of languages comprising: entering a prompt specifying source code and an instruction to extract translatable code elements from the source code into a large language model; receiving, from the large language model, a plurality of code elements extracted from the source code; sending the plurality of code elements to a multi-language software system; receiving, from the multi-language software system, the plurality of code ele-
``` ments converted to a second plurality of code elements in a different language; and replacing the plurality of code elements in the source code with the second plurality of code elements.

In one embodiment, the large language model is a generative large language model.

In one embodiment, the plurality of code elements comprise first hard coded text strings output to a user in the source code, wherein the second plurality of code elements comprise the second hard coded text strings output to the user corresponding to the first hard coded text strings translated into a different language, and wherein the large language model is trained to identify first hard coded text strings and replace the first hard coded text strings with links to one or more external files comprising the second hard coded text strings.

In one embodiment, the prompt is generated by a user.

In one embodiment, the prompt is a second prompt and the specified source code is source code to be generated, the method further comprising receiving a first prompt from a user to generate the source code and automatically modifying the second prompt to include the instruction to extract translatable code elements from the source code.

In one embodiment, the multi-language software system is a language translation software system that translates the plurality of code elements in a first language to the second plurality of code elements in the different language.

In one embodiment, further comprising: reviewing, by a user, the second plurality of code elements; and entering the second plurality of code elements into a language verification software system to verify the second plurality of code elements.

In one embodiment, the plurality of code elements comprise hard coded text strings in the source code, wherein the second plurality of code elements comprise the hard coded text strings translated into a different language.

In one embodiment, the entering, receiving the plurality of code elements, sending, receiving the second plurality of code elements, and replacement steps are incorporated into an integrated development environment as a translation plug-in.

In one embodiment, the entering, receiving the plurality of code elements, sending, receiving the second plurality of code elements, and replacement steps are incorporated into a build environment as a translation plug-in.

In one embodiment, the prompt specifying source code comprises an instruction to generate source code.

In one embodiment, the prompt specifying source code comprises the source code.

In one embodiment, the instruction to extract translatable code elements from the source code specifies a file to store the plurality of code elements.

In one embodiment, the prompt specifies a data structure of the source code and text values to be extracted.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of generating code in a plurality of languages comprising:

entering a prompt specifying source code and an instruction to extract translatable code elements from the source code into a generative large language model;

receiving, from the generative large language model, a first plurality of code elements extracted from the source code comprising first hard coded text strings output to a user;

sending the first plurality of code elements to a multi-language software system for translating the first hard coded text strings to second hard coded text strings in a different natural language than the first hard coded text strings, wherein the generative large language model is trained to identify the first hard coded text strings and replace the first hard coded text strings with links to one or more external files comprising the second hard coded text strings;

receiving, from the multi-language software system, a second plurality of code elements comprising the second hard coded text strings; and replacing the first plurality of code elements in the source code with the second plurality of code elements.

2. The method of claim 1, wherein the prompt is generated by a user.

3. The method of claim 1, wherein the prompt is a second prompt and the source code is source code to be generated, the method further comprising receiving a first prompt from a user to generate the source code and automatically modifying the second prompt to include the instruction to extract translatable code elements from the source code.

4. The method of claim 1, wherein the multi-language software system is a language translation software system that translates the first plurality of code elements in a first natural language to the second plurality of code elements in the different natural language.

5. The method of claim 1, further comprising:

reviewing, by a user, the second plurality of code elements; and entering the second plurality of code elements into a language verification software system to verify the second plurality of code elements.

6. The method of claim 1, wherein the entering, receiving the first plurality of code elements, sending, receiving the second plurality of code elements, and replacement steps are incorporated into an integrated development environment as a translation plug-in.

7. The method of claim 1, wherein the entering, receiving the first plurality of code elements, sending, receiving the second plurality of code elements, and replacement steps are incorporated into a build environment as a translation plug-in.

8. The method of claim 1, wherein the prompt specifying source code comprises an instruction to generate source code.

9. The method of claim 1, wherein the prompt specifying source code comprises the source code.

10. The method of claim 1, wherein the instruction to extract translatable code elements from the source code specifies a file to store the first plurality of code elements.

11. The method of claim 1, wherein the prompt specifies a data structure of the source code and text values to be extracted.

12. A computer system comprising:

at least one processor;

at least one non-transitory computer readable medium storing computer executable instructions that, when executed by the at least one processor, cause the computer system to perform operations for generating code in a plurality of languages comprising:

entering a prompt specifying source code and an instruction to extract translatable code elements from the source code into a generative large language model;

receiving, from the generative large language model, a first plurality of code elements extracted from the source code comprising first hard coded text strings output to a user;

sending the first plurality of code elements to a multi-language software system for translating the first hard coded text strings to second hard coded text strings in a different natural language than the first hard coded text strings, wherein the generative large language model is trained to identify the first hard coded text strings and replace the first hard coded text strings with links to one or more external files comprising the second hard coded text strings;

receiving, from the multi-language software system, a second plurality of code elements comprising the second hard coded text strings; and replacing the first plurality of code elements in the source code with the second plurality of code elements.

13. The computer system of claim 12, wherein the instruction to extract translatable code elements from the source code specifies a file to store the second plurality of code elements in a different language.

14. The computer system of claim 12, wherein the prompt specifies a data structure of the source code and text values to be extracted.

15. A non-transitory computer-readable medium storing computer-executable instructions that, when executed by at least one processor, perform operations for generating code in a plurality of languages comprising:

entering a prompt specifying source code and an instruction to extract translatable code elements from the source code into a generative large language model;

receiving, from the generative large language model, a first plurality of code elements extracted from the source code comprising first hard coded text strings output to a user;

sending the first plurality of code elements to a multi-language software system for translating the first hard coded text strings to second hard coded text strings in a different natural language than the first hard coded text strings, wherein the generative large language model is trained to identify the first hard coded text strings and replace the first hard coded text strings with links to one or more external files comprising the second hard coded text strings;

receiving, from the multi-language software system, a second plurality of code elements comprising the second hard coded text strings; and replacing the first plurality of code elements in the source code with the second plurality of code elements.

16. The non-transitory computer-readable medium of claim 15, wherein the instruction to extract translatable code elements from the source code specifies a file to store the second plurality of code elements in a different natural language.

17. The non-transitory computer-readable medium of claim 15, wherein the prompt specifies a data structure of the source code and text values to be extracted.

* * * * *